United States Patent Office 3,689,430
Patented Sept. 5, 1972

3,689,430
SURFACE ION EXCHANGED ASBESTOS COMPOSITIONS
Paul C. Yates, Wilmington, Del., assignor to E. I. du Pont de Nemours and Company, Wilmington, Del.
No Drawing. Continuation-in-part of abandoned application Ser. No. 758,129, Sept. 6, 1968. This application Aug. 10, 1971, Ser. No. 170,630
Int. Cl. B01j 13/00
U.S. Cl. 252—309
9 Claims

ABSTRACT OF THE DISCLOSURE

This invention relates to colloidal dispersions of surface modified disoriented and disaggregated fibrils of chrysotile asbestos in concentrated hydrotropic salt solutions having at least the surface ions of magnesium of said fibrils $10^{-4}$ to $10^{-3}$ equivalents per gram of asbestos replaced by lithium, calcium, barium, zinc, cadmium, cobalt or nickel ions; to the method for preparing said surface ion exchanged asbestos fibrils; and to dispersions in organic solvents formed when said surface ion exchanged asbestos fibrils are treated with anions of alkyl, aryl or alkylaryl sulfates, sulfamates, sulfonates, carboxylates and phosphates.

CROSS-REFERENCE TO RELATED APPLICATIONS

This case is a continuation-in-part of copending application Ser. No. 758,129, filed Sept. 6, 1968, now abandoned.

BACKGROUND OF THE INVENTION

This invention relates to a method for changing at least metallic surface ions of chrysotile asbestos fibrils and to the products of said method.

Naturally-occurring asbestos consists of ultimate fibrillar crystals or whiskers, having a diameter of from 10 to 50 millimicrons, oriented with their long axes parallel into massive bundles of many thousands of such ultimate particles, held together by strong forces of hydrogen bonding.

The prior art is familiar with several techniques for disorienting and disaggregating such naturally-occurring massive fibrous bundles into the ultimate fibrils. For example, U.S. Pats. 2,661,287, and 2,661,288 to G. D. Barbaras, disclose disorienting such massive fibrous bundles into their ultimate fibrils by agitating and shearing the naturally-occurring fibrous aggregates in the presence of dilute solutions of salts of polyvalent cations, such as aluminum, chromium, and zirconium, and anions such as acetates, nitrates, chlorides, and the like.

A different technique of dispersing asbestos to its ultimate fibrils is disclosed in a series of patents issued to Isador J. Novak, U.S. Pats. 2,685,825, 2,626,213, 2,662,-609, and 2,652,325. In these patents, organic surface-active agents such as the sodium salts of alkyl aryl sulfonates, long chain alkyl carboxylic acids, and long chain organic phosphates are employed as dispersing agents.

As disclosed in U.S. Pat. 2,626,213, when asbestos is treated with an aqueous solution of organic detergent surface active material said material is adsorbed on the asbestos fibers and is effective to disrupt the molecular bond between the agglomerated fibers. Apparently the organic surface active agent employed by Novak is chemically reacted with the magnesium hydroxide group in the asbestos surface, forming a half-magnesium soap with the organic tail of the surface active agent oriented in the direction of adjacently located fibrils in the fiber bundle. The insertion of these strongly chemically adsorbed surfactant molecules between the ultimate fibrils interferes with the hydrogen bonds holding them together, and the asbestos bundle is disaggregated and disoriented.

The prior art is also acquainted with procedures for disorienting and defibrillating asbestos which comprise essentially destroying the chrysotile asbestos structure by extended treatment with concentrated, highly acidic solutions, coupled with mechanical shearing and agitation. The resulting product is no longer chrysotile asbestos, but consists for the most part of amorphous silica pseudomorphs of the original fibrous structure which are relatively weak, and contain a multiplicity of pores on an atomic scale, where the magnesium hydroxide layers have been leached out.

U.S. 3,458,393 discloses a modified acid-treatment process in which the chrysotile structure is only partially destroyed. However, in common with other acid-treatment processes, this process weakens the structure and renders the fibers more susceptible to fracture.

The processes of this invention differ from all of those of the prior art, in that dispersion is effected in a very concentrated aqueous salt solution of the halides or pseudohalides of monovalent and divalent metals. Thus, the procedures of this case differ from those of Barbaras, which employs dilute, polyvalent metal salts which do not lead to extensive substitution of metal ions in the asbestos.

While the aqueous dispersions of Barbaras are very suitable for combining with aqueous dispersions of inorganic materials such as colloidal metal oxides, (U.S. 2,661,288), the fibers cannot be readily dispersed in organic polymers. This latter property is an important advantage of the dispersed surface treated asbestos of the present invention. It differs from the procedures of Novak, in that organic surface-active agents are not employed to disorient and disaggregate the asbestos fibrils.

It differs from the procedures of the prior art which involve a destruction of the chrysotile asbestos structure by treatment with acids, in that there is no destruction of the structure, nor is the dispersion carried out in acidic solutions.

The process of this invention thus represents a totally novel and in many ways, advantageous method for dispersing, disorienting and disaggregating asbestos into its ultimate fibrillar crystals.

The previously cited Novak art is obviously related to the process of this invention, but it has been found that the substitution in the surface of different atoms modifies the properties of the resulting dispersions in a very advantageous way. For example, it has been noted that when surface replacement is achieved by means of calcium or lithium, the mechanical stability of greases formed from such products by reacting with surface active agents is several times greater than when employing the products of the Novak patent.

The zinc, barium, cadmium, nickel, and cobalt substituted compositions are also capable of coupling actions with the surface-active organic molecules which are quite different in kind from those which occur when magnesium is present, since a basically different type of surface bond is formed.

It is also possible, particularly in the case of the nickel and cobalt surface-modified compounds, to reduce these compounds by hydrogen and achieve highly active catalysts due to the almost molecular state of subdivision of the nickel or cobalt in its ion exchange positions on the asbestos surface. This, of course, would not be possible with the products of Novak.

SUMMARY OF THE INVENTION

This invention relates to surface modified disoriented disaggregated asbestos fibers, to colloidal dispersions of these fibers in aqueous salt solutions, to disperion in organic solvent with organophilic surface-active agents and to the method of making the surface modified fibers. The surface modified fibers have $10^{-4}$ to $10^{-3}$ equivalents of magnesium per gram of asbestos replaced by a foreign metal, lithium, calcium, barium, zinc, cadmium, cobalt or nickel, and have a surface area of 20 to 100 m.$^2$/g. These fibers may be dispersed in aqueous hydrotropic salt solutions having at least 1 mole of the salt per liter. Dispersions of these fibers are also formed in organic solvents when from $10^{-4}$ to $5 \times 10^{-3}$ equivalents per gram of asbestos of an organophilic anionic surface-active agent are adsorbed on the surface of the surface modified asbestos. The surface modified asbestos fibers are formed by contacting naturally occurring asbestos fibers with a hydrotropic salt solution having a concentration of at least 1 mole of salt per liter.

DESCRIPTION OF THE PREFERRED EMBODIMENTS

This invention relates to colloidal dispersions of disoriented and disaggregated fibrils of chrysotile asbestos having at least the surface ions of magnesium of said fibrils replaced by lithium, calcium, barium, zinc, cadmium, cobalt or nickel ions and further to the dried residue of said dispersion. The colloidal dispersions of partially disoriented and disaggregated fibrils of chrysotile asbestos of this invention are obtained in concentrated solutions of the halides and pseudohalides of lithium, calcium, barium, zinc, cadmium, cobalt or nickel. As indicated above, the metal ion in the concentrated salt solution replaces at least the surface magnesium ion in the treated chrysotile asbestos.

The metals listed above all have metallic radii and charge-to-size ratios which are sufficiently similar to magnesium that in the presence of these very concentrated salt solutions, such substitution can occur.

Other products of the invention include dry powders of such partially disoriented, disaggregated ultimate fibrils which have been ion exchanged, as discussed above. These can be obtained from the concentrated colloidal dispersions simply by dilution of the dispersion with water to concentrations which are below critical limits which will be discussed in greater detail hereafter.

The degree of substitution of the metals mentioned for magnesium in the asbestos structure is dependent to some degree on the concentration of the salt solution in which dispersion occurs, as well as on the length of time of contact, the temperature, and the degree of agitation. However, it will be found that the substitution of at least a monolayer coverage of the surface of the asbestos by the ion-exchanged metal atom always occurs. The weight percentages of foreign metal atoms will vary, of course, with the atomic weight of the metal involved, but on a molar basis, at least $1 \times 10^{-4}$ moles of metal ion is substituted for magnesium per gram of asbestos. The more preferred products of the invention will have a greater degree of substitution and it is preferred to have from about $5 \times 10^{-4}$ to $10^{-3}$ moles of foreign metal atoms per gram of asbestos.

The degree of substitution can be determined by chemical analysis, using conventional methods such as atomic absorption analysis, or by wet chemical techniques familiar to the art. The amount of such surface substitution is usually detectable by conventional means due to the high surface area of the products of this invention, which will range broadly from 20 to 100 m.$^2$/g., and will preferably be in the range of from 30 to 80 m.$^2$/g. The percentage substitution corresponding to $4 \times 10^{-4}$ moles per gram of asbestos for a product having a surface area of 60 m.$^2$/g., for example, would be 0.28% lithium, or 1.6% calcium.

A preferred product of the invention is a partially disaggregated and disoriented ultimate fibril of chrysotile asbestos substituted as discussed above with foreign metal atoms, and then reacted chemically at its surface with organic acid anions.

The organic acid anions are derived from the group of organic acids broadly identified as anionic surface-active agents, wetting agents or detergents. They comprise the anions of acidic organic materials having more than 8 carbon atoms per molecule, and can be selected from alkyl, aryl, or alkyl-aryl compounds. The acidic functional group can be a sulfate, a sulfonate, a sulfamate, a carboxylate, or a phosphate. Substituted detergents or wetting agents such as the fluorinated or chlorinated derivatives of the above acids may also be employed.

Representative of such agents are alkylbenzene-sulfonates, alkylnaphthalene sulfonates, petroleum sulfonates, sulfonated fatty acid esters, and sodium stearate. Other suitable anionic surface active agents can be found listed in "Detergents and Emulsifiers," 1967 Annual by John W. McCutcheon, Inc.

The amount of such surface-active agent can be varied within fairly broad limits, but will generally be of the order of a monolayer based on the surface area of the products of the invention. As in the case of the metal atom substituents, the surface-active organic anion will generally be of the order of $1 \times 10^{-4}$ moles of the organic anion per gram of asbestos, and will usually not exceed about $5 \times 10^{-3}$ moles. Larger amounts than this generally are not chemically bonded to the asbestos surface, and are therefore dissolved away from the product when it is employed as a thickening agent for organic solvents.

In another embodiment of this invention, the partially disoriented and disaggregated ion-exchanged, organic anion-reacted asbestos fibrils are dispersed or suspended in a variety of organic solvents. Because of the extreme state of subdivision, the organic affinity imparted to them by the organic coating of surface-active agent, the high length to diameter ratios and the disaggregation, the disaggregated, ion-exchanged, organic anion-reacted asbestos fibrils of this invention are exceptional thickening agents for almost any type of organic liquid.

In fact, they appear to be the most efficient thickening agents which are known. They are several times as efficient in thickening lubricating oils to prepare greases, for example, as are conventional soaps, organic modified clays such as bentonite, or surface-esterified silica gels having a wide pore structure. They are similarly effective in thickening and suspending action for vegetable drying oils, such as are used in paints, and are generally useful in virtually any organic liquid where it is desired to obtain a very thick and viscous suspension with a minimum amount of additive.

As noted above, the percentage substitution by foreign metal atoms into the asbestos structure can be determined by routine chemical and analytical procedures. The surface area of the products of this invention can be determined by gas absorption methods such as by nitrogen absorption. The concentration of chemically reacted organic anions can be determined by analysis of the products of the invention for percent carbon, hydrogen, phosphorus, sulfur, or other characteristic constituents of the organic anion.

The degree of disaggregation and disorientation of the structure can be determined by taking electron micrographs of the products of the invention. The characteristic parallel orientation of the chrysotile asbestos fiber bundles are seen to be greatly modified, and that the individual asbestos fibrils having a diameter of 10 to 50 millimicrons and lengths from about a micron up to several hundred microns are seen to exist as swollen, partially disaggregated and disoriented fiber bundles, as a thin, web-like or brush-heap type of structure, as discrete fibrils or as mixtures of these in electron micrographs.

Another aspect of this invention relates to the method of converting naturally occurring, tightly bonded asbestos fiber bundles to ultimate fibrils of disoriented and disaggregated fibrils of asbestos. This method involves suspending the naturally occurring, tightly bonded asbestos fiber bundles in concentrated aqueous solutions of the halides and pseudohalides of lithium, magnesium, barium, calcium, zinc, cadmium, cobalt or nickel, and agitating and mechanically shearing such mixtures to disorient and disaggregate the asbestos into a stable colloidal dispersion. Representative salts which can be employed include lithium chloride, zinc chloride, calcium chloride, nickel chloride, cobalt chloride, as well as the bromides, iodides, cyanates, isocyanates, thiocyanates, and isothiocyanates of these metals.

Generally, the asbestos will be present in a concentration of from 0.1 to 10% by weight in the dispersing medium. Preferably, the asbestos will be present in a concentration of from 0.5 to 5% by weight in the dispersing medium.

It is usually preferred that the metal salt solutions be at least one molar in concentration, and it is more highly preferred that they be substantially more concentrated than this. This class of salts is characterized by an exceptionally high solubility in water, and solutions as concentrated as 10 or 20 molar are not unusual. However, so long as the concentration is in excess of about one molar, the dispersing and ion exchange characteristics of such solutions toward asbestos will be exhibited.

While the precise mechanism of action of such concentrated salt solutions is not known, it should be noted that this is the same class of salt solutions which is capable of dissolving substantial quantities of strongly hydrogen bonded organic polymers such as nylon polyamide polymers, "Orlon" polyacrylonitrile polymers and cellulose-based polymers. In such salt solutions, the number of water molecules only slightly exceeds, or in the more concentrated solutions, does not even attain the level of the number of water molecules required to fulfill the coordination sphere about the central metal atoms of the salt. These atoms may therefore coordinate strongly hydrogen bonded groups from organic polymers or from asbestos such as the silanol or MgOH surface groups present in the asbestos structure to complete their coordination sphere. Thus one might visualize a layer of such metal atoms as being adsorbed onto the surface of the asbestos ultimate fibrils, and thereby interfering with the hydrogen bonding which ordinarily holds such fibrils strongly together.

Furthermore, since the ionic size and charge on these foreign metal atoms are, in most instances, rather closely related to the size and charge of the magnesium atoms, it is easy to see that once substituted in the outer layer, additional substitution can occur by processes of diffusion in such a fashion that magnesium will be extracted from the asbestos surface, and the foreign metal atom will be substituted in its place. Since the concentration of the foreign metal atoms is very much greater in solution than that of the magnesium atoms, there will be a strong driving force to almost completely ion exchange at least the surface layer of the magnesium atoms in the asbestos structure.

Since this replacement reaction is a diffusion controlled ion exchange reaction, the extent of replacement of magnesium ions with foreign metal atoms will depend not only on the concentration of the foreign metal salt in the aqueous solution surrounding the asbestos particles, but also will be affected by the temperature, by the time of contact, and by the degree of agitation. By control of these factors, it is possible to vary the degree of substitution over quite wide ranges, and if extremely long contact times, high temperatures, and vigorous agitation are employed, it is possible to extend the ion exchange layer very substantially below the surface of the asbestos particles. Typical conditions for the practice of the process of this invention are contact times of the order of half an hour to several hours, at a temperature between 60 and 100° C., in the presence of the most vigorous possible type of agitation such as that furnished by a colloid mill, a milk homogenizer, a Waring Blendor, or some similar device capable of imparting high shearing forces with vigorous agitation. Although the ion exchange reaction and the disaggregation and disorientation are normally done under conditions described above, it is possible to employ either lower or somewhat higher temperatures. If the solutions are maintained at room temperature, for example, periods of time substantially longer than those indicated above will be required in order to achieve complete dispersion and surface ion exchange. Temperatures greater than 100° C. are possible even at atmospheric pressure because of the relatively low vapor pressure of these solutions in which case contact times and agitation times can be made correspondingly shorter.

Recovery of the products of this invention is a simple matter, since all that is required is to dilute the concentrated aqueous salt solution with additional water to a concentration below about one molar. The greater the degree of dilution, the more rapidly and completely the colloidal asbestos dispersion flocculates. Thus, it is easily possible to quantitatively recover the product in the form of a flocced mass simply by adding from 5 to 10 times the volume of the solution of water. This product can then be washed exhaustively to remove the remainder of the salt solution, but it will be found that it is not possible to wash away the ion-exchanged foreign metal atoms which have substituted themselves for magnesium in the asbestos structure. The products of the invention at this stage are defibrillated and disoriented, but are, of course, somewhat reaggregated as a result of the aggregation induced by dilution of the colloidal dispersion. This aggregation in the products enhances the thickening ability or the final products.

In yet another aspect of this invention, the partially disoriented and disaggregated fibrillar asbestos product obtained as explained above is treated with an anionic surface-active agent. Preferred anionic surface-active agents are selected from the group consisting of alkyl, aryl or alkyl-aryl sulfates, sulfamates, sulfonates, carboxylates and phosphates having in excess of eight carbon atoms per molecule. It will be understood however, that other anionic surface-active agents known to the art can also be employed to obtain these products as long as they impart the desired organophilic properties to the resultant product. The reaction between the disoriented and disaggregated fibrillar asbestos product and the surface-active agent can be achieved by contacting said asbestos product in aqueous or organic solution with a soluble salt of the anion of the surface-active agent. Sodium or ammonium salts of these anionic surface active agents are preferably employed for this purpose. It is also possible to contact the flocculated, partially disoriented asbestos aggregates with solutions of the free acid form of the organic anion. The affinity of the modified asbestos surface for such surface-active agents is very great. Generally speaking, a complete surface coverage will ensue, just from simply contacting as described above. The organic anions are too large to penetrate deeply into the asbestos structure as do the foreign metal atoms, and so the extent of the reaction in the case of the organic anions is limited to the surface region only. Following reaction with the organic ions, the excess can be washed away in a suitable solvent and the product dried.

These materials when dried are found to disperse easily with truly extraordinary thickening power in almost any organic solvent. They are organophilic due to their coating with the adsorbed and chemically reacted organic anions. Even as little as a few hundredths of a percent of the compositions of this invention exert an appreciable thickening action on organic fluids. At concentrations of the order of from 1 to 5%, the thickening action is so great that these materials become greases. Such greases are extraordinarily water-resistant and can be boiled in the presence of water for 3 to 4 days with no abstraction of the coated asbestos constituent into the water layer. The lithium and calcium modified products show very exceptional stability to mechanical shearing action. As noted above, their thickening efficiency is many times that of conventional soaps or other inorganic or inorganic-organic thickening agents which have hitherto been employed for these purposes. It should be noted also that mechanical stability of the lithium and the calcium substituted products are very much higher than those of the corresponding surface-active agent reacted products of the earlier discussed Novak reference. It may be that the lithium or calcium ions are less adequately shielded by the organic molecules, and can reorient to re-establish a brush-heap or network structure more rapidly following shearing than is possible with the corresponding Novak products.

Other uses of the composition of the invention include their use as catalyst and catalyst substrates, such as in the case of the hydrogen-reduced cobalt and nickel, substituted compositions of the invention.

The compositions of this invention can also be employed as reinforcing agents in solid organic polymers, which can be prepared by mixing solutions of the organic polymers with dispersions of the compositions of this invention. Such products offer interesting opportunities to vary the bonding between the organic polymer and the reinforcing colloidal fibril, because of the different chemical nature of the ions substituted for magnesium in the structure of the fiber.

The following examples are presented to better illustrate this invention.

Parts and percentages in the following examples are by weight unless otherwise specified.

EXAMPLE 1

Two thousand parts distilled water were heated to boiling, and to this were added 1200 parts anhydrous calcium chloride. One hundred parts Arizona No. 2 grade asbestos previously fluffed up in a Waring Blendor was added and the mixture agitated at top speed on an Eppenbach Homomixer, which is a high speed dispersing colloid mill of the type normally used for homogenizing milk. Following this the mixture was put through 7 passes on a Gaulin homogenizer. The Gaulin homogenizer is a colloid mill of the type which functions by extruding materials through a small orifice under a high pressure drop causing extensive shearing action.

The stable, homogeneous, colloidal solution was then diluted to 10,000 parts with water, which cause the flocculation of the asbestos into macroscopic flocs. This was washed and thoroughly dried, with the washing being carried out until no further chloride test was given in the wash liquid. Half of the product was analyzed in this condition, and the other half was added to 20 parts sodium stearate in 4,000 parts distilled water. This mixture was then violently agitated on the homomixer for 1 hour, and flocculated by the addition of acetone. It was washed and dried to remove all non-chemically reacted sodium stearate. The reaction product was analyzed for calcium, magnesium, silica, carbon, hydrogen, as well as the nitrogen surface area. The nitrogen surface area of the product was 31 m.$^2$/g. the percent silica, 24.7, the percent magnesium, 22, and the percent calcium oxide, 4.5. The carbon concentration of the soap-coated or organic acid-reacted portion was 5.38%. The above analyses correspond to $8 \times 10^{-4}$ moles of ion-exchanged calcium per gram of asbestos (it should be noted that this sample of asbestos contained no calcium prior to reaction), and $2.8 \times 10^{-4}$ moles of stearate anion per gram of asbestos.

This material was mixed with a standard lubricating oil of the type employed in preparing lubricating greases, and it was found that a 10% concentration gave a very thick No. 1 grade grease, having a micropenetration of 48, while at a 5% concentration it gave a micropenetration of 154. As a basis of comparison with grease thickening agents previously known to the art, the concentration of calcium soap required to achieve the same thickening would be about 22% soap for a micropenetration of 48, and about 10.5% soap for a micropenetration comparable to that of 154.

The improved mechanical stability of this composition relative to the most nearly comparable composition of the herein discussed Novak patent was illustrated by preparing a product of the Novak patent using sodium stearate to disperse unmodified natural asbestos and flocculating the resulting aqueous dispersion by the addition of acetone. While comparable in initial grease thickening efficiency with the composition of this invention just discussed, the product of the Novak patent thinned out to a grease of such thin consistency that the penetrometer cannot be employed to measure its consistency after only one and one-half hours of rolling in a shell roller test facility. This is a rolling mill containing a large revolving weight which puts the grease under high mechanical shearing forces.

In contrast, the composition of this invention thinned out only to a moderate degree, even after 10½ hours of rolling on the shell roller. In addition, it was put through this test for 8 successive days, using approximately 10 hours milling each day, and at the beginning of each day's test following resting overnight, it was found that its thickening efficiency had not changed perceptibly from that which it had initially. In contrast, the product of Novak prepared as described above decreased in thickening efficiency after only 1½ hours in the test and did not subsequently recover its thickening effectiveness.

EXAMPLE 2

Excellent dispersions of chrysotile asbestos were achieved using the procedures of Example 1 in a 50% aqueous solution of zinc chloride in water, a 67% solution of zinc bromide in water, and in a 23% mixture of zinc chloride in dimethylformamide and a 34% mixture of zinc bromide in dimethylformamide. In the absence of the zinc chloride or zinc bromide, the DMF swells the asbestos but does not disperse it. In contrast, the mixtures of DMF and zinc chloride or DMF and zinc bromide gave water-clear, permanently stable colloidal dispersions.

EXAMPLE 3

Twenty parts Arizona No. 2 grade of asbestos was mixed with a solution of 400 parts lithium chloride and 400 parts water. After stirring with a spatula until a viscous paste resulted, 1400 parts dimethylformamide were added. The resulting solution was agitated 7 minutes in a laboratory Waring Blendor at its top speed. A blue-white, viscous, optically clear dispersion resulted. This was flocculated by addition of acetone, washed twice with acetone and dried overnight in a vacuum desiccator at 130° C. Chemical analysis indicated that 2.26% lithium had been picked up by the asbestos fibers, which corresponds to $7.2 \times 10^{-3}$ moles of lithium per gram of asbestos. Electron micrographs show tangled, interlocking, partially disoriented and disaggregated fibrils of asbestos approximately 30 millimicrons in diameter and several hundred millimicrons in length. The surface area of the resulting product is 34 m.$^2$/g.

EXAMPLE 4

Twenty parts asbestos were treated in the same manner discussed in Example 3 except that 400 parts zinc chloride were substituted for the lithium chloride and only 800 parts dimethylformamide were used. The resulting suspension was not quite as clear as that achieved with the lithium chloride. After flocculating with acetone, the colloidal dispersion was dried in a vacuum oven at 130° C. The resulting analysis for zinc was 8.2%, which corresponds to $1.2 \times 10^{-3}$ moles of zinc per gram of asbestos. The nitrogen surface area of this product was 20 m.$^2$/g., and the electron micrograph showed a similar, swollen and partially disaggregated and disoriented structure as for the example just described.

What is claimed is:

1. A surface modified, disoriented, disaggregated ultimate fibrillar crysotile asbestos material in which from $10^{-4}$ to $10^{-3}$ equivalents of magnesium per gram of said asbestos material are replaced by a foreign metal ion selected from the group consisting of lithium, calcium, barium, zinc, cadmium, cobalt and nickel, said asbestos material having a surface area of from 20 to 100 m.$^2$/g.

2. The asbestos material of claim 1 in which from $5\times10^{-4}$ to $10^{-3}$ equivalents of magnesium per gram of asbestos are replaced by a foreign metal ion.

3. A colloidal dispersion of from 0.1 to 10% by weight of surface modified, disoriented, disaggregated ultimate fibrillar chrysotile asbestos in which from $10^{-4}$ to $10^{-3}$ equivalents of magnesium per gram of said asbestos are replaced by a foreign metal ion selected from the group consisting of lithium, calcium, barium, zinc, cadmium, cobalt and nickel, said asbestos having a surface area of from 20 to 100 m.$^2$/ g., said dispersion containing at least 1 mole of hydrotropic salt per liter.

4. The colloidal dispersion of claim 3 containing from 0.5 to 5% by weight of said surface modified, disoriented, disaggregated ultimate fibrillar chrysotile asbestos.

5. A method of obtaining a colloidal dispersion of surface modified, disoriented, disaggregated ultimate fibrils of chrysotile asbestos comprising contacting naturally occurring tightly bonded asbestos fiber bundles with a hydrotropic salt selected from the group consisting of the halides and pseudohalides of lithium, zinc, calcium, nickel and cobalt in an agitated aqueous system containing at least 1 mole of hydrotropic salt per liter of solution.

6. The method of claim 5 in which the hydrotropic salt employed is selected from the group consisting of lithium chloride, zinc chloride, calcium chloride, nickel chloride or cobalt chloride.

7. A dispersion in an organic liquid of from 0.1 to 10% by weight of surface modified, disoriented, disaggregated chrysotile asbestos fibrils in which from $10^{-4}$ to $10^{-3}$ equivalents of magnesium per gram of said asbestos are replaced by a foreign metal ion selected from the group consisting of lithium, calcium, barium, zinc, cadmium, cobalt and nickel, said fibrils having adsorbed on their surface from $10^{-4}$ to $5\times10^{-3}$ equivalents of an organophilic anionic surface-active agent per gram of asbestos fibrils.

8. The dispersion of claim 7 in which the anion of the organophilic surface-active agent is selected from the group consisting of alkyl, aryl and alkylaryl sulfonates, sulfamates, sulfates, carboxylates and phosphates having more than 8 carbon atoms per molecule.

9. The dispersion of claim 7 in which said asbestos fibrils comprise from one to five percent by weight of said dispersion.

References Cited
UNITED STATES PATENTS 3,057,744 10/1962 Barbaras _____ 106—286
3,519,591 7/1970 Bolger _____ 260—37

JOHN D. WELSH, Primary Examiner

U.S. Cl. X.R.

252—313; 162—3, 153; 23—110; 106—306, 292, 301; 117—126